United States Patent [19]

Mori

[11] Patent Number: 4,907,134

[45] Date of Patent: Mar. 6, 1990

[54] VEHICLE LAMP

[75] Inventor: Hideshi Mori, Shizuoka, Japan

[73] Assignee: Koito Manufacturing Co., Ltd., Tokyo, Japan

[21] Appl. No.: 358,766

[22] Filed: May 30, 1989

[30] Foreign Application Priority Data

May 31, 1988 [JP] Japan .................... 63-131599

[51] Int. Cl.[4] ............................. B60Q 1/00
[52] U.S. Cl. .................................. 362/61
[58] Field of Search .................. 362/61, 80, 83

[56] References Cited

U.S. PATENT DOCUMENTS 4,831,502  5/1989  Fujiho et al. .................... 362/61

*Primary Examiner*—Carroll B. Dority
*Attorney, Agent, or Firm*—Sughrue, Mion, Zinn, Macpeak & Seas

[57] ABSTRACT

A vehicle lamp secured to a vehicle body by slidably inserting the lamp into a bracket from the front of the vehicle body. A rim is formed along the periphery of a lens closing the front opening of the body of the lamp, with the rim being substantially integral with the lens. Two mounting lens extend from the right and left sides of the rim rearward of the lens. The mounting lens are moved towards or away from a bracket secured to the vehicle body at the front of the vehicle body so as to be engaged with or disengaged from the bracket through an engaging structure.

5 Claims, 5 Drawing Sheets

VEHICLE LAMP

BACKGROUND OF THE INVENTION

The present invention relates to a vehicle lamp which is fixedly mounted on a bracket secured to the vehicle body by slidably inserting it in the bracket from the front of the vehicle body. More particularly the invention relates to a vehicle lamp fixing structure which is provided around the lens which closes the front opening of the lamp body.

The external design of a vehicle lamp mounted on the vehicle body forms a part of the external design of the vehicle itself. Accordingly, to improve the appearance of vehicle lamps such as fog lamps and turn signal lamps, there has been a strong demand for decreasing the thickness of the front lens which is exposed outside the lamp or for flattening the outer lens surface. On the other hand, a so-called combination lamp in which a plurality of vehicle lamps different in function are juxtaposed has been extensively employed, which too should be matched with other components of the vehicle in design.

The structure of such a conventional vehicle lamp is such that, as shown in FIGS. 9A to 9C, an engaging groove 51 is formed in the periphery of a lamp body 50, and a seal leg 53 formed along the periphery of a lens 52 closing the front opening of the lamp body 50 is inserted into the engaging groove 51. The seal leg 53 and the engaging groove 51 are joined together with an adhesive. At the front of the vehicle body A, the vehicle lamp thus constructed is inserted into the vehicle body A, and is then fixed to a bracket 54 with screws 55, the bracket 54 being secured to the vehicle body A. Accordingly, the peripheral portion of the vehicle lamp is exposed, and can be observed by a person standing at the front of the vehicle body A. In order to cover the peripheral portion thus exposed, a rim 56 provided separately from the lens 52 is disposed along the periphery of the lens 52.

The above-described rim 56 is disadvantageous in that after the vehicle lamp has been secured to the vehicle body A, the rim 56 is fixed to the mounting structure 57 with screws 58 or the like, the mounting structure being formed on the side of the lamp body 50 or the bracket 54. This not only lowers the efficiency of installing the vehicle lamp, and but also require the provision of a large gap for the installation of the rim. In addition, being arranged between the vehicle lamp and other components of the vehicle, the rim disturbs the harmony of the combination lamp in design with the vehicle body.

SUMMARY OF THE INVENTION

In view of the foregoing, an object of the present invention is to provide a vehicle lamp in which a rim is formed around the periphery of a lens closing the front opening of the lamp body in such a manner that it is integral or substantially integral with the lens, and means is provided for fixing the vehicle lamp to a bracket secured to the vehicle body, whereby the gaps formed between the vehicle lamp and other components of the vehicle body are reduced, and the vehicle lamp is made harmonious in design with the vehicle body.

The foregoing and other objects of the invention have been achieved by the provision of a vehicle lamp in which, according to the invention, a rim is formed along the periphery of a lens closing the front opening of a lamp body in such a manner that the rim is integral or substantially integral with the lens, and two mounting legs extend from the right and left side of the rim rearward of the lens, the mounting legs being moved towards or away from a bracket secured to a vehicle body at the front of the vehicle body so as to be engaged with or disengaged from the bracket through an engaging structure. In the inventive vehicle lamp, the engaging structure is provided on the bracket so that it is engaged with an engaging hole formed in at least one of the mounting leg. The engaging structure is a U-shaped clip which is elastic in the opening and closing directions and has a protrusion on a free arm thereof, which is engaged with the inner edge of the engaging hole. If desired, the protrusion may be provided separate from the bracket so that it can be detachably coupled to the bracket. Alternatively, the engaging structure may be a snap pin instead of the clip.

DESCRIPTION OF THE PREFERRED EMBODIMENTS

Figure 1:
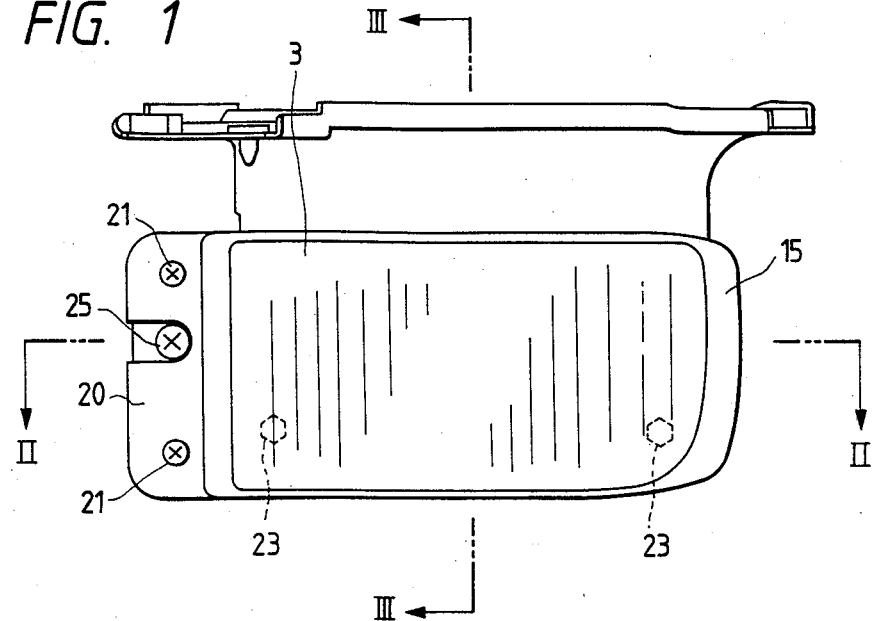
FIG. 1 is a front view of a vehicle lamp constructed according to the present invention.
Figure 2:
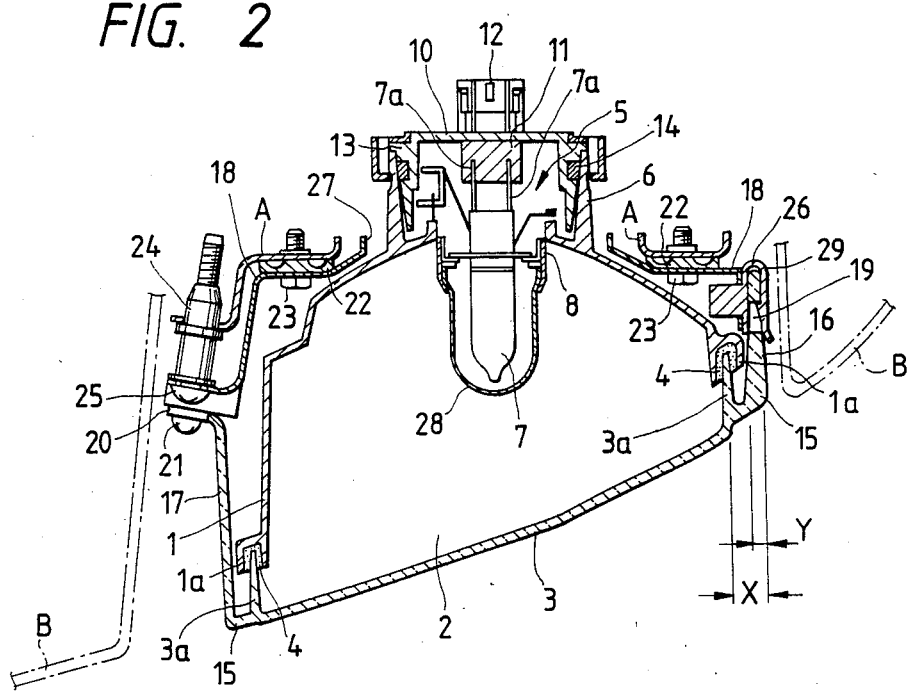
FIG. 2 is a sectional view taken along a line II—II in FIG. 1.
Figure 3:
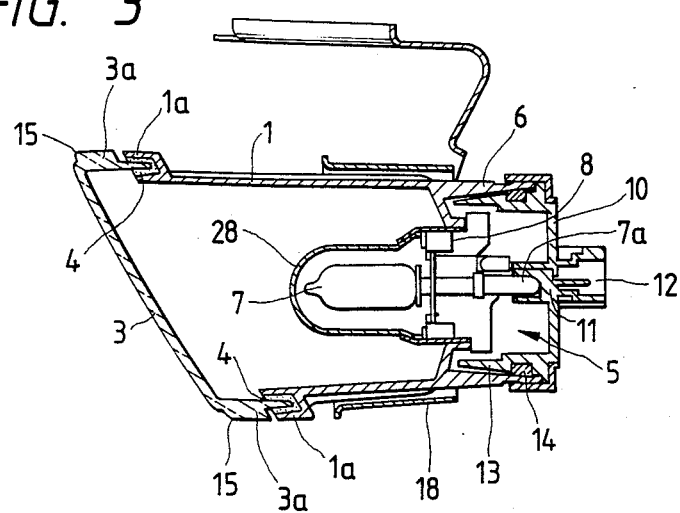
FIG. 3 is a sectional view taken along a line III—III in FIG. 1.
Figure 4:
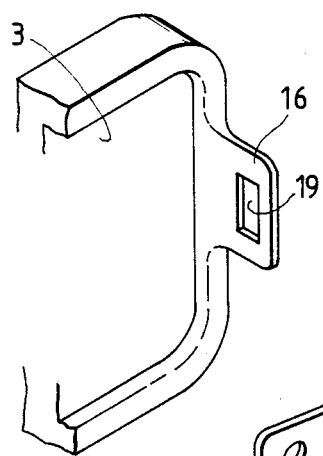
FIGS. 4 and 5 are enlarged perspective views showing mounting legs forming a rim.
Figure 5:
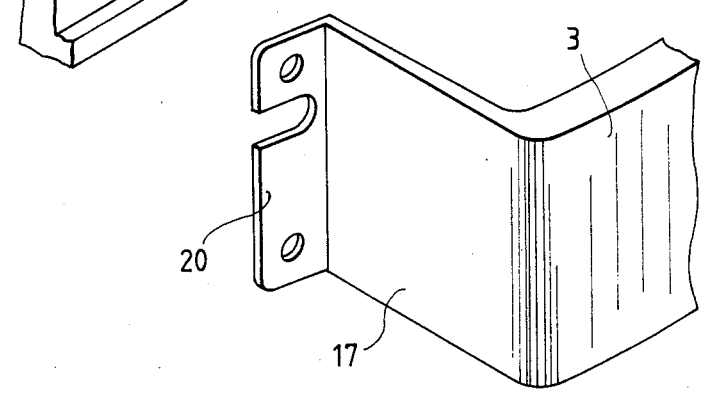
Figure 6A:
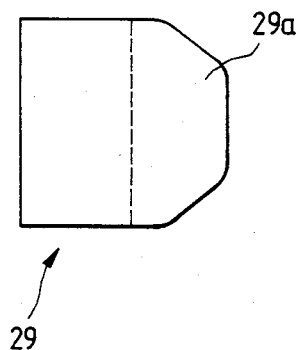
FIG. 6A is top view of the clip used in the lamp structure of FIG. 1, which clip is an example of an engaging structure.
Figure 6B:
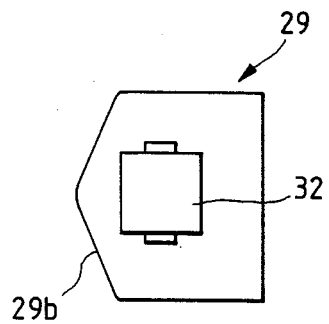
FIG. 6B is a bottom view of the clip.
Figure 6C:
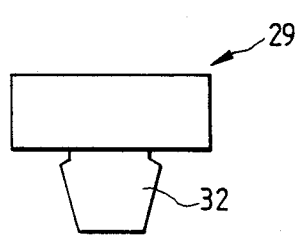
FIG. 6C is a rear view of the clip.
Figure 6D:
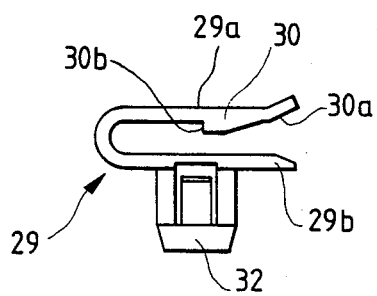
FIG. 6D is a side view of the clip.
Figure 6E:
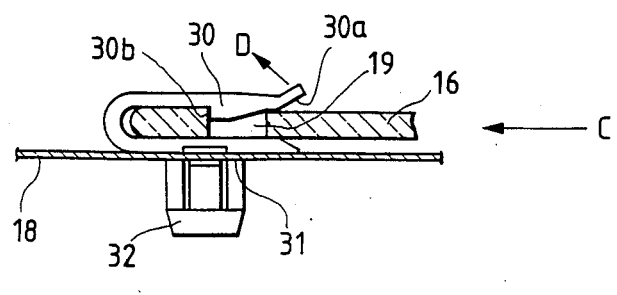
FIG. 6E is a sectional side view of the clip through which a mounting leg is engaged with a bracket.

Examples of a vehicle lamp constructed according to the invention will be described with reference to FIGS. 1 through 8.

In these figures, reference numeral 1 designates a relatively thin lamp body for forming a lamp unit. The lamp body defines a lamp chamber 2 with a front opening. The inner surface of the lamp body is processed into a reflecting surface. The front opening is closely covered with a lens 3. An engaging groove 1a is formed in the periphery of the front opening of the lamp body. A sealing leg 3a formed along the periphery of the lens 3 is engaged with the engaging groove 1a, and the two are joined together with an adhesive 4. A bulb mounting hole 5 is formed in the lamp body 1 at the center in such a manner that the hole 5 is surrounded by a cylinder 6.

A light bulb 7 is installed in the lamp chamber 2 as follows: The light bulb 7, after being fitted in a bulb holder 8, is inserted into the lamp chamber 1 through the cylinder 6 and the bulb mounting hole 5, and the bulb holder 8 is secured to the rear wall of the lamp body 1 with a suitable hook or retainer 9. Connectors 11 and 12 are provided on the inner and outer surfaces of a cap 10, respectively, which is used to close the cylinder 6. When the cylinder 6 is covered with the cap 10, simultaneously the connector 11 is electrically connected to the terminals 7a of the light bulb 7 and the connector 12, to which electrical wires (not shown) extended from the vehicle body A. The cap 10 includes a cylinder 13, which is fitted sealingly in the above-described cylinder 6 of the lamp body 1 with an O-ring 14 fitted on the cylinder 13.

Reference numeral 15 designates a rim which is provided along the periphery of the lens 3 in such a manner that it is integral or substantially integral with the lens 3. The rim 15 is formed at the same time as the lens 3 so that it is integral with the lens 3. Alternatively, the rim 15 and the lens may be molded separately. In the latter case, the rim 15 and the lens 3 are joined, for instance, with the use of an adhesive. The edge width of the rim 15 should cover the difference X between the width of the lamp body and that of the lens 3, and accept the thickness of mounting legs 16 and 17 (described later). In this case, the gap between the vehicle lamp and a vehicle structure B (such as a grill or bumper provided on the vehicle body A) can be reduced to the edge width of the vehicle lamp, and a vehicle structure B (such as a grill or bumper provided on the vehicle body A) can be reduced to the edge width of the rim 15. The mounting legs 16 and 17 are adapted to be secured to a bracket 18 which is used to fixedly mount the vehicle lamp on the vehicle body A. The mounting legs 16 and 17 extend rearward from the sides of the rim 15 in such a manner that they cover the opposite sides of the lamp body. At least one of the legs, namely, the leg 16, has an engaging hole 19 into which an engaging structure such as a clip 29 or snap pin 33 (described later) secured to one end portion of the bracket 18 is inserted. The other leg 17 has a fixing edge portion which is secured to the other end portion of the bracket 18, for instance, with screws 21.

In this embodiment, the bracket 18 is fixedly mounted on the vehicle body A through spacers 22 with screws 23. An adjusting screw 25, with its head engaged with the bracket 18, is screwed into a nut 24 which has been fixedly secured to the vehicle body A. By turning the adjusting screw 25 in a desired direction, the optical axis of the lamp unit can be adjusted with mounting bolts (not shown) acting as adjustment axes.

One end face of the mounting leg 16 having the engaging hole 19 is formed with a slanted surface 26 so as to facilitate the sliding engagement of the engaging structure provided on the bracket 18. The bracket 18 has a hole 27 substantially at the center to receive the cylinder 6 which is formed on the rear wall of the lamp body 1, as described above. Therefore, with the lamp body 1 secured to the bracket 18, the cap 10 can be removed from the lamp body from the rear. Once the bulb holder 8 has been removed from the lamp body 1, then the light bulb 7 can easily be replaced. Reference numeral 28 designates a colored globe for coloring the light beam from the light bulb 7.

FIGS. 6A through 6E show a example of the engaging structure provided on the bracket 18. The engaging structure includes a U-shaped clip 29 which is elastic in its opening and closing directions. The U-shaped clip 29 has a protrusion 30 on the inner wall of its free arm 29a, which protrusion 30 is engaged with the engaging hole 19 formed in the mounting leg 16. The protrusion 30 has a slanted surface 30a which is inclined to the direction of insertion of the mounting leg 16 (direction of the arrow C), and has a step 30b set back from the rear end of the slanted surface 30a towards the inner wall of the free arm 29a.

With this construction, when the mounting leg 16 is inserted between the free arm 29a and the fixed arm 29b of the U-shaped clip 29, the step 30b of the U-shaped clip 29 is engaged with the engaging hole 19 formed in the mounting leg 16, thus locking the latter. By pushing the slanted surface of the free arm 29a outward, the step 30b can be disengaged from the engaging hole 19 of the mounting leg 16, and accordingly the lamp unit can be removed linearly from the front side of the vehicle body A.

In this embodiment, the clip 29 is provided separately from the bracket 18, and a fixing pin 32 is formed on the outer wall of the fixed arm 29. The fixing pin 32 is inserted into a fixing hole 31 formed in the bracket 18.

Figure 7:
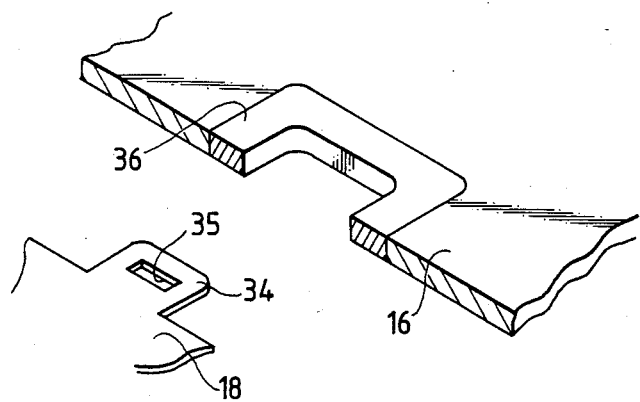
FIG. 7 is an enlarged perspective view showing the mounting leg and bracket which provide a snap pin, which is another example of the engaging structure.
Figure 8A:
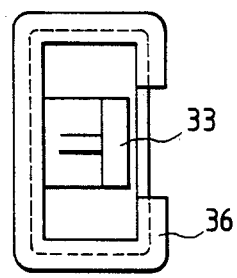
FIG. 8A is a plan view of the snap pin in FIG. 7.
Figure 8B:
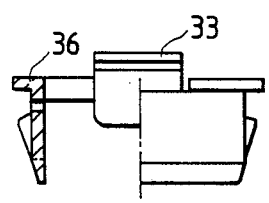
FIG. 8B is a front view, with parts cut away, of the snap pin.
Figure 8C:
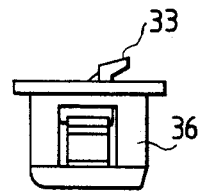
FIG. 8C is a side view of the snap pin.
Figure 8D:
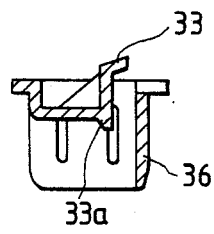
FIG. 8D is a sectional side view of the snap pin.
Figure 8E:
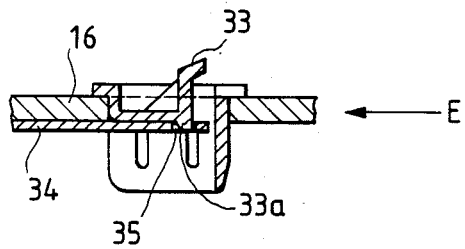
FIG. 8E is a sectional side view showing the snap pin secured to the mounting leg and the bracket.
Figure 9A:
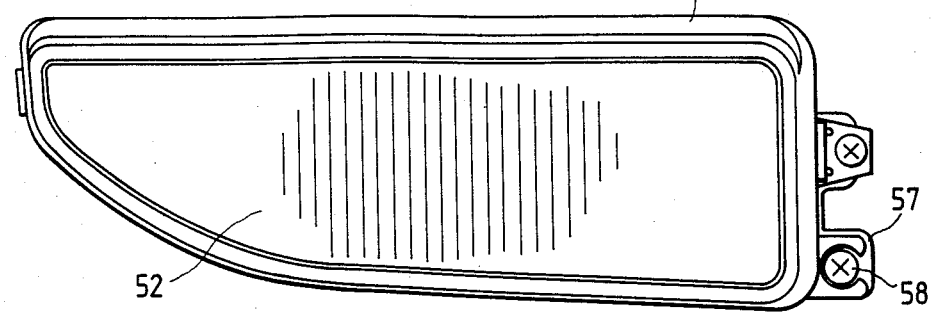
FIG. 9A shows a front view of an example of a conventional vehicle lamp.
Figure 9B:
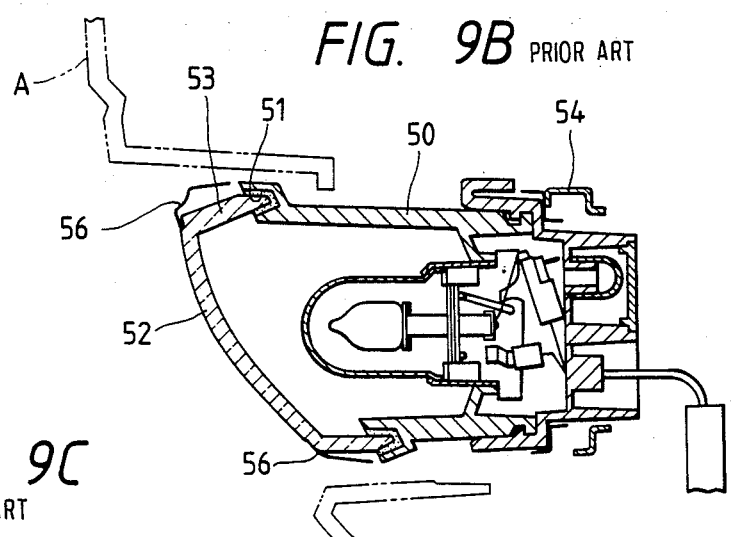
FIG. 9B is a sectional side view of the conventional vehicle lamp.
Figure 9C:
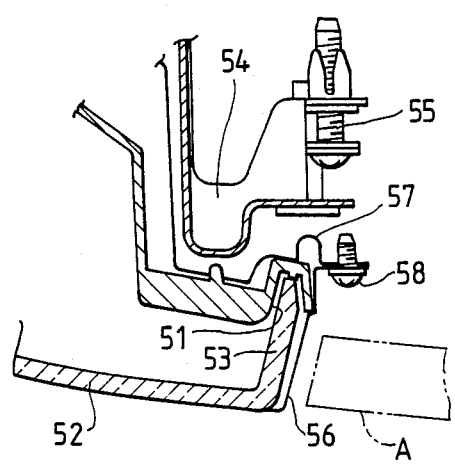
FIG. 9C is an enlarged sectional view showing essential components of the conventional vehicle lamp.

FIGS. 7 and 8 show another example of the engaging structure. At least one of the mounting legs, namely, the mounting leg 16, has a snap pin 33, and the bracket 18 includes a mounting leg 34. An engaging hole 35 is formed in the end portion of the mounting leg 34, and an engaging protrusion 33a formed on the snap pin 33 is inserted into the hole 35 thus formed. The mounting leg 16 is slidably moved with respect to the mounting leg 34 in the direction of the arrow D so that the mounting leg 16 is engaged with the bracket 18. In FIGS. 7 and 8a–8d reference numeral 36 designates a supporting frame which is formed integrally with the snap pin 33 to secure the latter to the mounting leg 16.

The construction and installation of the engaging structure such as the above-described clip or snap pin, and the structure of the vehicle lamp itself are not limited to those which have been described above; that is, they may be freely changed and modified without departing from the invention.

Specifically, the engaging structure may be provided on both sides of the vehicle lamp so as to eliminate the need for fixing elements such as screws.

In mounting the vehicle lamp thus constructed on the vehicle body A, the vehicle lamp is inserted in the bracket 18 linearly from the front of the vehicle body, and the engaging structure is engaged with the bracket 18. Then, it is secured with screws, when necessary.

With the vehicle lamp according to the invention constructed as described above, the lamp can be fixedly mounted on the bracket from the front of the vehicle body with ease. Furthermore, not only is the efficiency of installation work of the vehicle lamp on a vehicle body increased, but also the gaps between the vehicle lamp and other vehicle lamps or components on the vehicle body can be decreased. In addition, the arrangement around the vehicle lamp is improved in external appearance. Furthermore, in the vehicle lamp of the invention, the rim can be made of the same material as the lens, with the result that the rim is more positively integral with the lens.

What is claimed is:

1. A vehicle lamp, comprising:
   a bracket secured to a vehicle body at the front of said vehicle body;
   an engaging structure;
   a lamp body;
   a lens closing a front opening in said lamp body;
   a rim formed along a periphery of said lens, said rim being substantially integral with said lens;
   two mounting legs extending from respective right and left sides of said rim rearward of said lens, said mounting legs being moved towards or away from said bracket so as to be engaged with or disengaged from said bracket through said engaging structure.

2. The vehicle lamp as claimed in claim 1, wherein an engaging hole is formed in at least one of said mounting legs, and where said engaging structure comprises a U-shaped clip provided on said bracket for engaging with said hole formed in said mounting leg, thereby to couple said bracket to said mounting leg.

3. The vehicle lamp as claimed in claim 2, wherein said clip has a free arm on an inner wall on which a protrusion is formed in such a manner as to be engageable with an inner edge of said engaging hole.

4. The vehicle lamp as claimed in claim 1, wherein said engaging structure comprises: a snap pin provided on at least one of said mounting legs, said snap pin having an engaging protrusion, an engaging hole being formed in said bracket to receive of said engaging protrusion of said snap a pin.

5. The vehicle lamp as claimed in claim 2 or 4, wherein said engaging structure is separate from said mounting leg or bracket so that said engaging structure can be secured in position to said mounting leg or bracket.

* * * * *